June 10, 1930.    R. ECKSTEIN ET AL    1,762,163
ELECTRICAL CONNECTING DEVICE
Filed Oct. 26, 1927
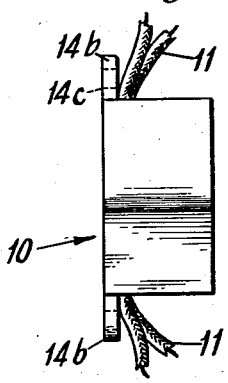
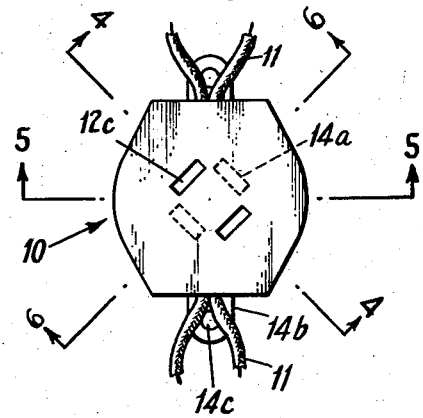
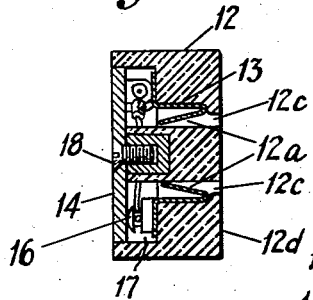
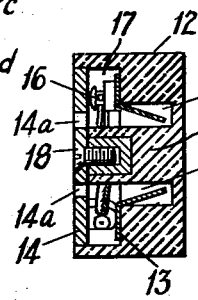
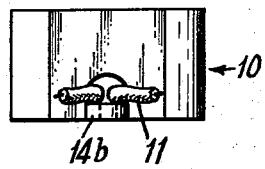
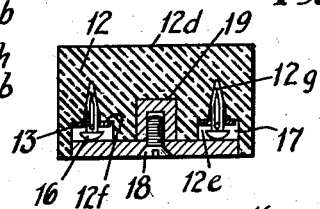
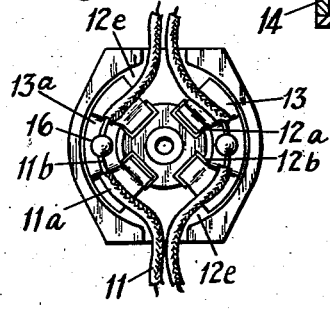
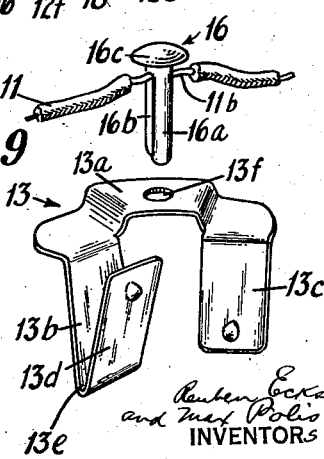
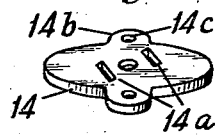

Patented June 10, 1930

1,762,163

UNITED STATES PATENT OFFICE

REUBEN ECKSTEIN, OF BRONX, NEW YORK, AND MAX POLIS, OF BROOKLYN, NEW YORK

ELECTRICAL CONNECTING DEVICE

Application filed October 26, 1927. Serial No. 228,808.

This invention relates to electrical connecting devices.

One object of the invention is to provide an electrical connecting device of improved construction adapted to be used either as a utility outlet fitting for connecting branch circuits with open-wired or portable feed circuits, or as a tap-connector suitable for inter-connecting in parallel circuits a plurality of Christmas tree or other lighting outfits.

Another object of the invention is to provide in an electrical fitting of the character described, novel means for securing the conductor wires to the current carrying parts of the fitting and for anchoring said wires and parts to the body of the fitting.

A further object of the invention is to provide an improved electrical device of the character described which shall comprise few and simple parts, form a rugged structure, permit of ready attachment of branch to main circuits, which device shall be easily incorporated into the electrical system, cheap to manufacture, and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Figs. 1, 2 and 3 are side, front and end elevational views, respectively, of a utility outlet fitting or tap connector for electric circuits embodying the invention;

Figs. 4, 5 and 6 are cross-sectional views taken on lines 4—4, 5—5 and 6—6, respectively, in Fig. 2;

Fig. 7 is a rear elevational view of the improved fitting with the back plate removed to expose the interior construction;

Fig. 8 is a perspective view of the back plate of the fitting, and

Fig. 9 is a perspective view of one of the current carrying parts and the novel conductor wire securing means shown separated therefrom.

Referring in detail to the drawing, 10 denotes a tap connector or utility outlet fitting embodying the invention. One or more of such connectors may be connected to a suitable electric supply source through conductor wires 11 of a feed circuit or portable conductor wires of a decorative lighting outfit, such as a Christmas tree lighting set, (not shown), in facilitating the interconnection of parallel branch extension circuits, in the well understood manner.

The fitting 10 is seen to comprise a body 12, preferably formed of molded insulating material, having suitable recesses $12^a$ and $12^b$ into which spaced current carrying members 13 are fitted, and a back-plate 14 secured to the rear side of the body for enclosing said member, as clearly shown in Figs. 4 and 5. Pairs of parallel recesses $12^a$ and $12^b$ are provided, the pairs being arranged at right angles to each other. The pair of recesses $12^a$ extends through the body, each recess having an inlet opening $12^c$ on the front side $12^d$. Said recesses are preferably spaced apart so as to conform to the amount of separation of the contact blades of standard cap-plugs (not shown). Thus a standard cap-plug forming part of a branch circuit may be plugged into contact with the current carrying parts 13 by inserting the said contacting blades of such plug into the opening $12^c$ in the well understood manner.

The recesses $12^b$ have the same spacing as $12^a$ but are blind-ended at the ends adjacent the front side $12^d$ of the body. The back-plate 14 is provided with inlet openings $14^a$ which register with the recesses $12^b$ wherethrough cap-plug blades (not shown) may be inserted to engage the current carrying members 13.

The current carrying members 13 are made preferably from spring sheet material such as copper or bronze, and comprise a saddle portion $13^a$ from the opposite ends of which extend the blade engaging spring contact members 13ᵇ and 13ᶜ.

The contact member 13ᵇ is folded back on itself so that the folded portion 13ᵈ forms a resilient structure, the bight 13ᵉ presenting a smooth end for guiding a cap-plug blade, when inserted through the opening 12ᶜ into the recess 12ᵃ. The spring contact 13ᶜ may comprise a tongue extending into the recess 12ᵇ, said tongue being bent to resist movement of the cap-plug blade when the latter is inserted through a back-plate opening 14ᵃ, assisting in smoothly guiding said blade into position.

The spring contacts 13ᵇ and 13ᶜ form radial and downward extensions from an arcuate saddle portion 13ᵃ, the sections to which said contacts are connected lying at a lower level than the central portion of said saddle portion. In the recessed rear portion 17 of body 12, raised shoulders 12ᶠ are provided upon which the saddle portion 13ᵃ is adapted to be seated, as shown in Fig. 7. By this means, the member 13 is retained rigidly in proper position and restrained from any side motion.

To demountably fasten the bared portion 11ᵇ of wire 11 in position and to retain said portion in electrical contact with the current carrying member 13, a novel form of terminal post 16 as shown in Fig. 5 is provided. Said post is seen to comprise a rivet having a split shank 16ᵃ which is adapted to receive the bared wire portion 11ᵇ in the bifurcation 16ᵇ. The saddle portion 13ᵃ is perforated at 13ᶠ to permit passage of said split shank therethrough, whereby the latter may be inserted into an underlying tapered hole 12ᵍ. Thus the bared wire portion 11ᵇ is tightly clamped in the bifurcation of the split shank 16ᵇ and is secured to the current-carrying member 13 by the wedging action resulting when the rivet is inserted in the hole as shown in Fig. 5.

The head 16ᶜ of the rivet projects above the wire 11 to facilitate the removal and disconnection at will of the wire 11 from the current carrying member 13. It should be noted that the terminal post 16 not only secures the bared wire portion 11ᵇ to the current carrying member 13 but also firmly fixes the latter to the body 12.

The back-plate 14 may be fitted into the recess 17 provided in the rear side of the body 12ᵃ and into abutment with a raised portion 12ʰ projecting into said recess. The plate 14 is retained by a screw 18 threaded into a bushing 19 embedded in raised portion 12ʰ. Plate 14 is also positioned to bear against the heads 16ᶜ of terminal posts 16 to retain the posts fixed in their position.

Where the fitting 10 is to be mounted against a supporting surface, said plate 14 may be provided with one or more lugs 14ᵇ adapted to extend beyond the edge of body 12 and having perforations 14ᶜ for receiving suitable fastening means, such as screws or nails, (not shown).

To install the improved fitting 10, the current-carrying members 13 are assembled in the body 12, the conductor wires 11 bared at the part where it is desired to apply the fitting, said wires being then laid into recess 17, the rivets of binding posts 16 then applied to clamp and wedge the wires and members to the body 12. The back plate 14 is then applied. One or more of the fittings may be connected to the feed wires of a circuit at any selected point or points, each fitting providing a tap for connecting branch circuits in parallel.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described our invention, we claim as new and desire to secure by Letters Patent:—

1. An electric fitting of the character described comprising an insulating body, spaced current carrying members housed in said body, terminal posts having split shanks extending through said members, lead wires received in said body and extending thru the split portion of said shanks, said body having openings for receiving said shanks, and an insulating member secured to said body and adapted to coact with said posts for retaining said shanks in said openings.

2. In combination with an electric fitting having an insulating body, a conductor wire, and a terminal post having a bifurcated shank straddling said wire, said body having a tapering hole registering with said opening for wedgingly anchoring the wire to said body upon forcing said shank into said hole.

3. In combination with an electric fitting, an insulating body having a tapered hole, a current carrying member mounted on said body and having an opening registering with said hole, said member having a spring contact portion, a conductor wire contacting with the latter, and a rivet having a split shank extending into said opening and hole, said shank engaging the wire in the bifurcation thereof and being wedgingly clamped in said tapered hole for anchoring the wire and member to said body.

In testimony whereof we affix our signatures.

REUBEN ECKSTEIN.
MAX POLIS.